United States Patent
Malik et al.

(10) Patent No.: US 12,244,402 B2
(45) Date of Patent: Mar. 4, 2025

(54) SATELLITE COVERAGE CHANGE HANDLING

(71) Applicant: Nokia Solutions and Networks Oy, Espoo (FI)

(72) Inventors: Amit Malik, Palatine, IL (US); Liwa Wang, Morris Plains, NJ (US); Timothy Curtis, Chandler, AZ (US); Alan Matten, Chicago, IL (US); Andrew Repoza, Naperville, IL (US); Zai Chen, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/224,105

(22) Filed: Jul. 20, 2023

(65) Prior Publication Data

US 2024/0031016 A1    Jan. 25, 2024

(30) Foreign Application Priority Data

Jul. 22, 2022  (FI) ..................................... 20225682

(51) Int. Cl.
*H04B 7/185* (2006.01)
*H04W 16/26* (2009.01)
(Continued)

(52) U.S. Cl.
CPC ........ *H04B 7/18541* (2013.01); *H04W 16/26* (2013.01); *H04W 36/322* (2023.05); *H04W 48/04* (2013.01); *H04W 48/10* (2013.01)

(58) Field of Classification Search
None
See application file for complete search history.

(56) References Cited

U.S. PATENT DOCUMENTS

| 5,625,868 A | 4/1997 | Jan et al. ..................... 455/13.4 |
| 2004/0132451 A1* | 7/2004 | Butehorn ........... H04B 7/18584 455/445 |

(Continued)

FOREIGN PATENT DOCUMENTS

CN    112399496 A    2/2021

OTHER PUBLICATIONS

3rd Generation Partnership Project; Technical Specification Group Radio Access Network; NR, "User Equipment (UE) procedures in Idle mode and RRC Inactive State (Release 17)," 3GPP TS 38.304 V17.0.0, Mar. 2022.

(Continued)

*Primary Examiner* — Charles N Appiah
*Assistant Examiner* — Frank E Donado
(74) *Attorney, Agent, or Firm* — McCarter & English LLP

(57) ABSTRACT

There are provided measures for satellite coverage change handling. Such measures exemplarily include, at a network entity managing a first cell of a mobile network and a second cell of said mobile network, the first cell covering a geographical area, and the second cell covering said geographical area, maintaining assignment of a first satellite beam corresponding to a first passing satellite to said first cell, a first satellite beam coverage of said first satellite beam overlapping with said geographical area, determining entrance of a second satellite beam coverage of a second satellite beam corresponding to a second passing satellite into said geographical area, assigning said second satellite beam to said second cell, and deciding to trigger handover of a terminal located within said second satellite beam coverage within said geographical area and served by said first cell to said second cell.

11 Claims, 6 Drawing Sheets

(51) Int. Cl.
*H04W 36/32* (2009.01)
*H04W 48/04* (2009.01)
*H04W 48/10* (2009.01)

(56) References Cited

U.S. PATENT DOCUMENTS

| | | | |
|---|---|---|---|
| 2016/0323800 A1 | 11/2016 | Ulupinar et al. | |
| 2018/0006713 A1* | 1/2018 | Hreha | H04B 7/18534 |
| 2020/0029265 A1 | 1/2020 | Choquette | |
| 2021/0045170 A1 | 2/2021 | Luo et al. | |
| 2021/0409109 A1* | 12/2021 | Lauer | H04B 17/318 |
| 2022/0046504 A1* | 2/2022 | Shrestha | H04W 36/08 |
| 2022/0150806 A1* | 5/2022 | Tripathi | H04B 17/318 |
| 2022/0225266 A1* | 7/2022 | Kumar | H04W 60/06 |
| 2022/0240151 A1* | 7/2022 | Yu | H04B 7/0695 |
| 2023/0014581 A1* | 1/2023 | Yu | H04W 56/005 |
| 2023/0268984 A1* | 8/2023 | Xu | H04B 7/1851 375/262 |
| 2024/0162978 A1* | 5/2024 | Cheema | H04W 36/12 |
| 2024/0244499 A1* | 7/2024 | Ramachandra | H04W 8/08 |

OTHER PUBLICATIONS

Thales "NTN Switch Overs" 3GPP $3^{rd}$ Generation Partnership Project Draft; R3-210151, Jan. 15, 2021.

Qualcomm Incorporated "Gateway Switch Procedure for Earth Fixed and Moving Beam Scenarios" 3GPP $3^{rd}$ Generation Partnership Project Draft; R2-2009453. Oct. 23, 2020.

Thales "NR-NTN: Feeder Link Switch Over" 3GPP $3^{rd}$ Generation Partnership Project Draft; R3-206347. Oct. 22, 2020.

CMCC "Consideration on Signaling Issues for Mobility Enhancements" 3GPP $3^{rd}$ Generation Partnership Project Draft; R2-2103701. Apr. 2, 2021.

Ericsson "[POST111e] [910] [NTN] Impacts of Earth Fixed and Moving Beams" 3GPP $3^{rd}$ Generation Partnership Project Draft; R2-2009820. Oct. 23, 2020.

Ericsson "Aspects for Earth Fixed and Earth Moving Beams for NTN" 3GPP $3^{rd}$ Generation Partnership Project Draft; R2-2103747. Apr. 1, 2021.

* cited by examiner

SATELLITE COVERAGE CHANGE HANDLING

FIELD

Various example embodiments relate to satellite coverage change handling. More specifically, various example embodiments exemplarily relate to measures (including methods, apparatuses and computer program products) for realizing satellite coverage change handling.

BACKGROUND

The present specification generally relates to provision of a cellular service to existing 3rd Generation Partnership Project (3GPP) Long Term Evolution (LTE) and $5^{th}$ Generation (5G) subscribers using a low earth orbit satellite system.

In such low earth orbit satellite system, a satellite is acting as radio frequency (RF) antenna for the system, while the baseband (BB) unit is located at a ground station. In such systems, a satellite provides coverage to a location on the ground only for a limited amount of time. After this time, the satellite moves on, and the coverage to the geographical location is provided by another satellite.

The satellite system is trying to interwork with commercial mobile devices (terminals, subscribers, user equipment (UE), e.g., mobile phones) using the existing LTE/5G standard.

As low orbit satellites are used, the satellites move in and out of a serving area in which a respective mobile device is served.

To provide continuous service to the mobile devices, satellite beams of a setting satellite ("move-out" satellite) and a rising satellite ("move-in" satellite) overlap in a serving area for a short period of time.

When a switch of satellite happens (for a mobile device), the time advance can change significantly for the mobile device which would result in the connection being lost or going through reestablishment if the cell's RF was just switched between beams instantaneously.

Further, allowing the mobile devices to just perform reestablishments would result in the mobile devices losing RF connectivity and would also result in contention based random access channel (RACH) sequences which would cause physical random access channel (PRACH) collisions in a heavily loaded cell requiring an extended delay.

Hence, the problem arises that the provision or backing of cellular services utilizing low earth orbit satellites may lead to service continuity distortion and increased management and negotiation traffic.

Hence, there is a need to provide for satellite coverage change handling.

SUMMARY

Various example embodiments aim at addressing at least part of the above issues and/or problems and drawbacks.

Various aspects of example embodiments are set out in the appended claims.

According to an exemplary aspect, there is provided a method of a network entity managing a first cell of a mobile network and a second cell of said mobile network, the first cell covering a geographical area, and the second cell covering said geographical area, the method comprising maintaining assignment of a first satellite beam corresponding to a first passing satellite to said first cell, a first satellite beam coverage of said first satellite beam overlapping with said geographical area, determining entrance of a second satellite beam coverage of a second satellite beam corresponding to a second passing satellite into said geographical area, assigning said second satellite beam to said second cell, and deciding to trigger handover of a terminal located within said second satellite beam coverage within said geographical area and served by said first cell to said second cell.

According to an exemplary aspect, there is provided an apparatus of a network entity managing a first cell of a mobile network and a second cell of said mobile network, the first cell covering a geographical area, and the second cell covering said geographical area, the apparatus comprising maintaining circuitry configured to maintain assignment of a first satellite beam corresponding to a first passing satellite to said first cell, a first satellite beam coverage of said first satellite beam overlapping with said geographical area, entrance determining circuitry configured to determine entrance of a second satellite beam coverage of a second satellite beam corresponding to a second passing satellite into said geographical area, assigning circuitry configured to assign said second satellite beam to said second cell, and deciding circuitry configured to decide to trigger handover of a terminal located within said second satellite beam coverage within said geographical area and served by said first cell to said second cell.

According to an exemplary aspect, there is provided an apparatus of a network entity managing a first cell of a mobile network and a second cell of said mobile network, the first cell covering a geographical area, and the second cell covering said geographical area, the apparatus comprising at least one processor, at least one memory including computer program code, and at least one interface configured for communication with at least another apparatus, the at least one processor, with the at least one memory and the computer program code, being configured to cause the apparatus to perform maintaining assignment of a first satellite beam corresponding to a first passing satellite to said first cell, a first satellite beam coverage of said first satellite beam overlapping with said geographical area, determining entrance of a second satellite beam coverage of a second satellite beam corresponding to a second passing satellite into said geographical area, assigning said second satellite beam to said second cell, and deciding to trigger handover of a terminal located within said second satellite beam coverage within said geographical area and served by said first cell to said second cell.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient handover between passing satellites to thereby solve at least part of the problems and drawbacks identified in relation to the prior art.

By way of example embodiments, there is provided satellite coverage change handling. More specifically, by way of example embodiments, there are provided measures and mechanisms for realizing satellite coverage change handling.

Thus, improvement is achieved by methods, apparatuses and computer program products enabling/realizing satellite coverage change handling.

BRIEF DESCRIPTION OF THE DRAWINGS

In the following, the present disclosure will be described in greater detail by way of non-limiting examples with reference to the accompanying drawings, in which.

DETAILED DESCRIPTION

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) satellite coverage change handling.

In brief, according to example embodiments, the handover functionality in the existing LTE/5G standard or corresponding future cell based mobile network standards is utilized to switch the satellite serving a subscriber, i.e., a mobile device such as a terminal.

As the baseband (BB) unit is located at the ground station, it does not need to change.

According to example embodiments, the BB unit uses two independent physical cells to cover a geographical area.

Here, basically, one cell is connected to a move-out (setting) satellite, and one cell is to a move-in (rising) satellite.

According to example embodiments, during the period when the two satellites are overlapping, the UEs (i.e., mobile devices such as terminals) served by the setting cell (RF connected to the setting satellite) execute a handover to the rising cell (RF connected to the rising satellite). Thus, to a subscriber (i.e., mobile device such as a terminal) this will look like a regular handover and no software change is needed at the mobile device.

Example embodiments are specified below in more detail.

Figure 1:
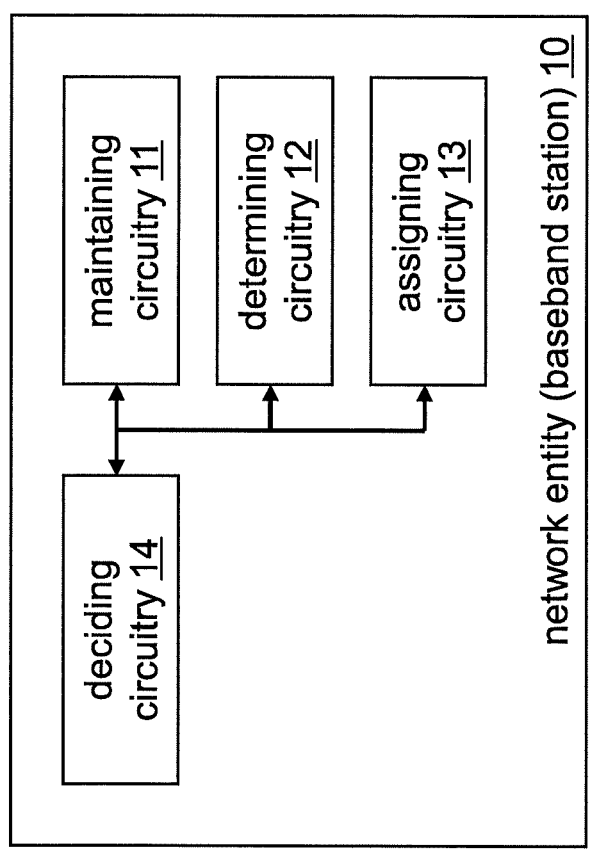
FIG. 1 is a block diagram illustrating an apparatus according to example embodiments.
Figure 3:
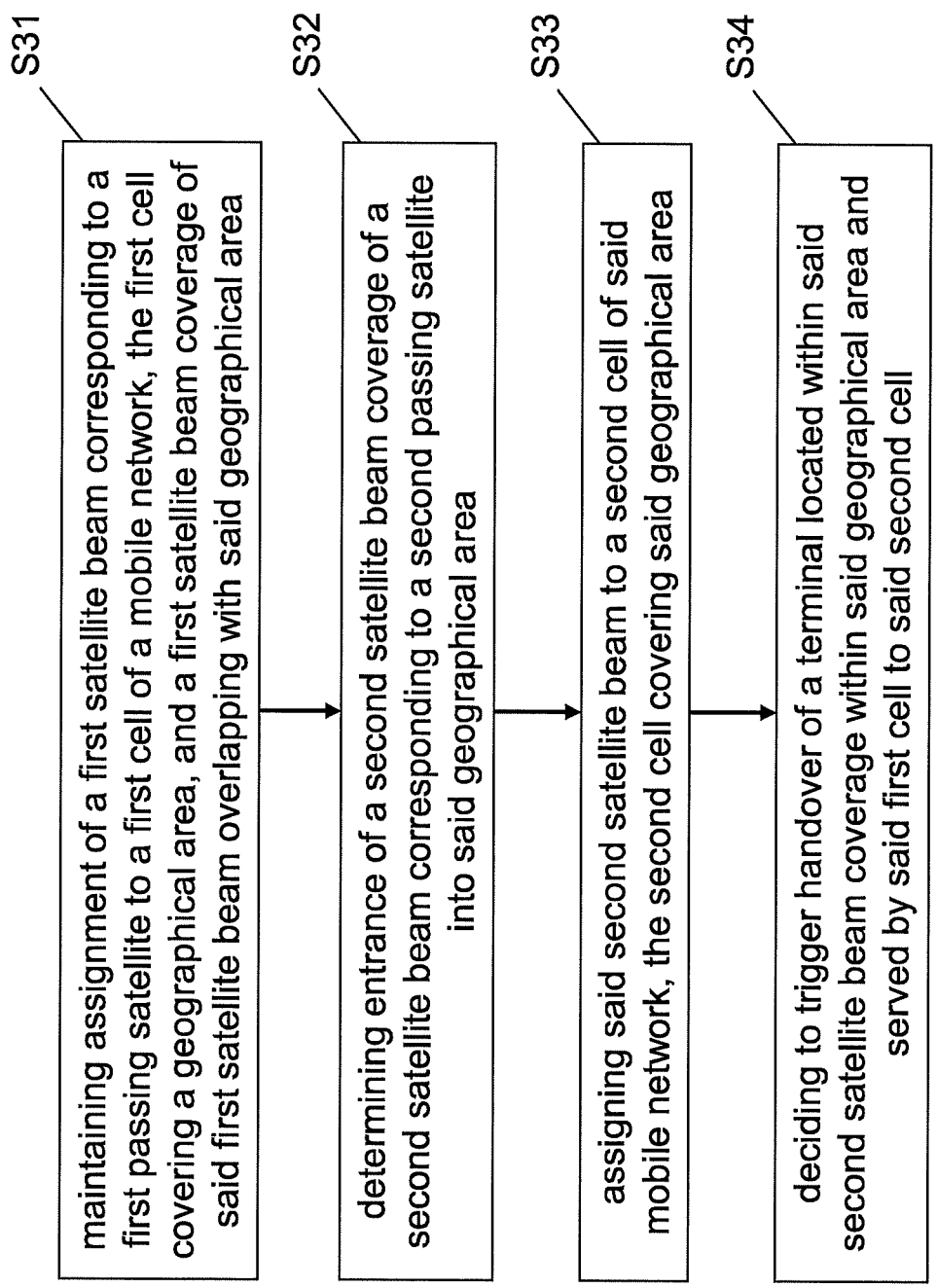
FIG. 3 is a schematic diagram of a procedure according to example embodiments.

FIG. 1 is a block diagram illustrating an apparatus according to example embodiments. The apparatus may be a network node or entity 10 such as a baseband station (managing a first cell of a mobile network and a second cell of said mobile network, the first cell covering a geographical area, and the second cell covering said geographical area) comprising a maintaining circuitry 11, a determining circuitry 12, an assigning circuitry 13, and a deciding circuitry 14. The maintaining circuitry 11 maintains assignment of a first satellite beam corresponding to a first passing satellite to said first cell, a first satellite beam coverage of said first satellite beam overlapping with said geographical area. The determining circuitry 12 determines entrance of a second satellite beam coverage of a second satellite beam corresponding to a second passing satellite into said geographical area. The assigning circuitry 13 assigns said second satellite beam to said second cell. The deciding circuitry 14 decides to trigger handover of a terminal located within said second satellite beam coverage within said geographical area and served by said first cell to said second cell. FIG. 3 is a schematic diagram of a procedure according to example embodiments. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure according to example embodiments comprises an operation of maintaining (S31) assignment of a first satellite beam corresponding to a first passing satellite to said first cell, a first satellite beam coverage of said first satellite beam overlapping with said geographical area, an operation of determining (S32) entrance of a second satellite beam coverage of a second satellite beam corresponding to a second passing satellite into said geographical area, an operation of assigning (S33) said second satellite beam to said second cell, and an operation of deciding (S34) to trigger handover of a terminal located within said second satellite beam coverage within said geographical area and served by said first cell to said second cell.

Figure 2:
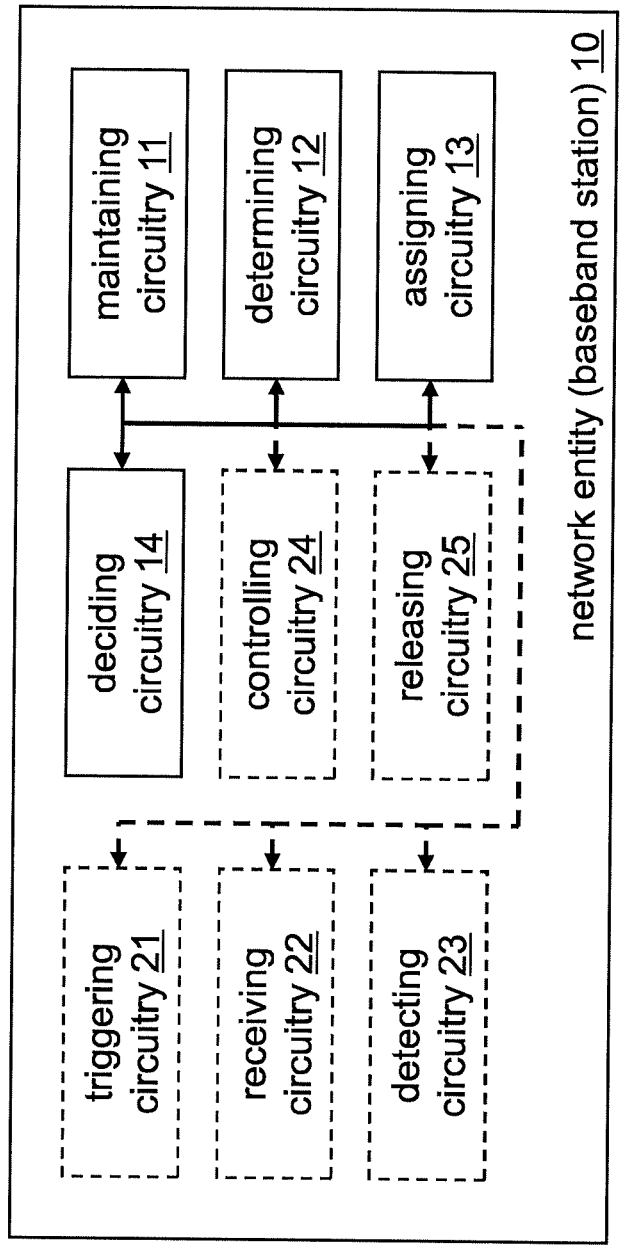
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a triggering circuitry 21, a receiving circuitry 22, a detecting circuitry 23, a controlling circuitry 24, and/or a releasing circuitry 25.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 3, exemplary additional operations are given, which are inherently independent from each other as such. According to such variation, an exemplary method according to example embodiments may comprise an operation of triggering said handover of said terminal to said second cell.

According to a variation of the procedure shown in FIG. 3, exemplary details of the deciding operation (S34) (deciding to trigger handover of said terminal) are given, which are inherently independent from each other as such. Such exemplary deciding operation (S34) according to example embodiments may comprise at least one of an operation of receiving signaling indicative of that said second satellite beam is available in said second cell, an operation of receiving, from said terminal, a measurement report indicative of that said second cell is available for said terminal, an operation of receiving, from said terminal, an indication of said second cell as being a handover candidate, and an operation of detecting an active radio frequency link on said second cell.

According to a variation of the procedure shown in FIG. 3, exemplary additional operations are given, which are inherently independent from each other as such. According to such variation, an exemplary method according to example embodiments may comprise an operation of controlling said first cell to broadcast cell barring.

According to a variation of the procedure shown in FIG. 3, exemplary additional operations are given, which are inherently independent from each other as such. According to such variation, an exemplary method according to example embodiments may comprise an operation of controlling said first cell to start a cell barring timer and to stop broadcasting said cell barring upon expiration of said cell barring timer.

According to a variation of the procedure shown in FIG. 3, exemplary additional operations are given, which are inherently independent from each other as such. According to such variation, an exemplary method according to example embodiments may comprise an operation of determining to release said assignment of said first satellite beam to said first cell.

According to a variation of the procedure shown in FIG. 3, exemplary additional operations are given, which are inherently independent from each other as such. According to such variation, an exemplary method according to example embodiments may comprise an operation of releasing said assignment of said first satellite beam to said first cell.

According to a variation of the procedure shown in FIG. 3, exemplary additional operations are given, which are inherently independent from each other as such. According to such variation, an exemplary method according to example embodiments may comprise an operation of determining entrance of a third satellite beam coverage of a third satellite beam corresponding to a third passing satellite into said geographical area, an operation of assigning said third satellite beam to said first cell, and an operation of deciding to trigger handover of a terminal located within said third satellite beam coverage within said geographical area and served by said second cell to said first cell.

According to a variation of the procedure shown in FIG. 3, exemplary details of the determining operation (determining to release said assignment) are given, which are inherently independent from each other as such. Such exemplary determining operation according to example embodiments may comprise at least one of an operation of detecting completed handover of all terminals served by said first cell to said second cell, and an operation of detecting that said first satellite beam coverage of said first satellite beam does not overlap with said geographical area.

Example embodiments outlined and specified above are explained below in more specific terms.

Figure 4:
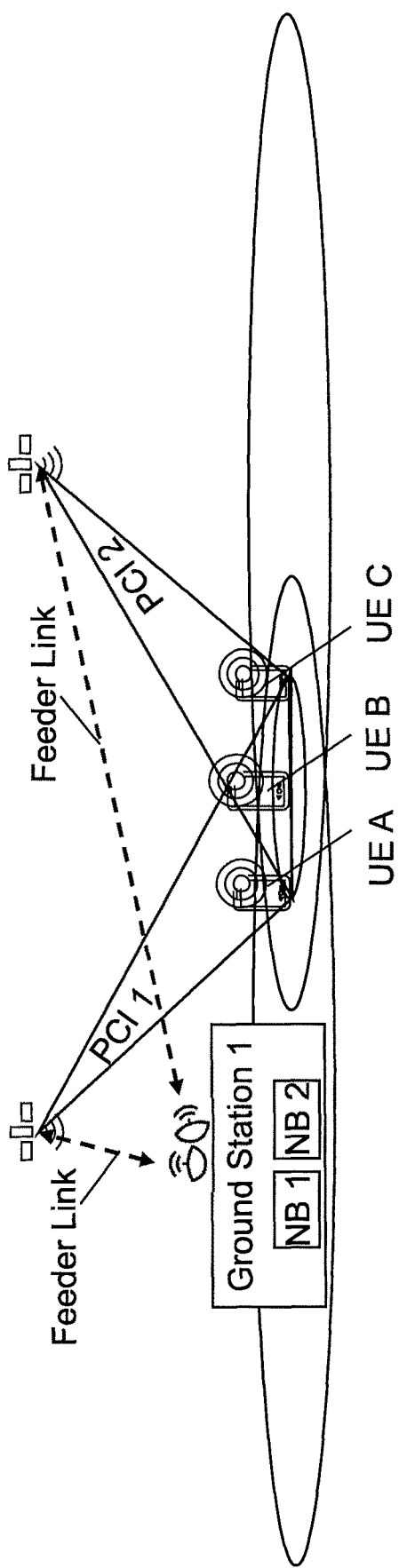
FIG. 4 is a schematic diagram of a radio scenario including two satellites having overlapping coverages and a ground station according to example embodiments.

FIG. 4 is a schematic diagram of a radio scenario including two satellites having overlapping coverages and a ground station according to example embodiments.

According to example embodiments, two independent and physical LTE/5G cells (or cells of future cellular networks) are utilized to provide coverage for a geographical location.

The two cells act as a pair to facilitate a satellite beam handover.

Heretofore, as illustrated in FIG. 4, a baseband unit (provided at/by a ground station), having a plurality of NodeBs (in the example illustrated in FIG. 4: NB 1, NB 2), and managing the two cells is connected to two satellites (a setting (departing) satellite and a rising (incoming/approaching) satellite). The two satellites are moving, and this, a coverage of the two satellites moves. As illustrated in FIG. 4, the coverage of the two satellites overlap to some extend.

According to example embodiments, mobile devices (e.g. UEs) (in the example illustrated in FIG. 4: UE A, UE B, UE C) located within the coverage overlap of the two satellites are handed over from the cell corresponding to the setting (departing) satellite (setting cell) to the cell corresponding to the rising (incoming/approaching) satellite (rising cell).

Figure 5:
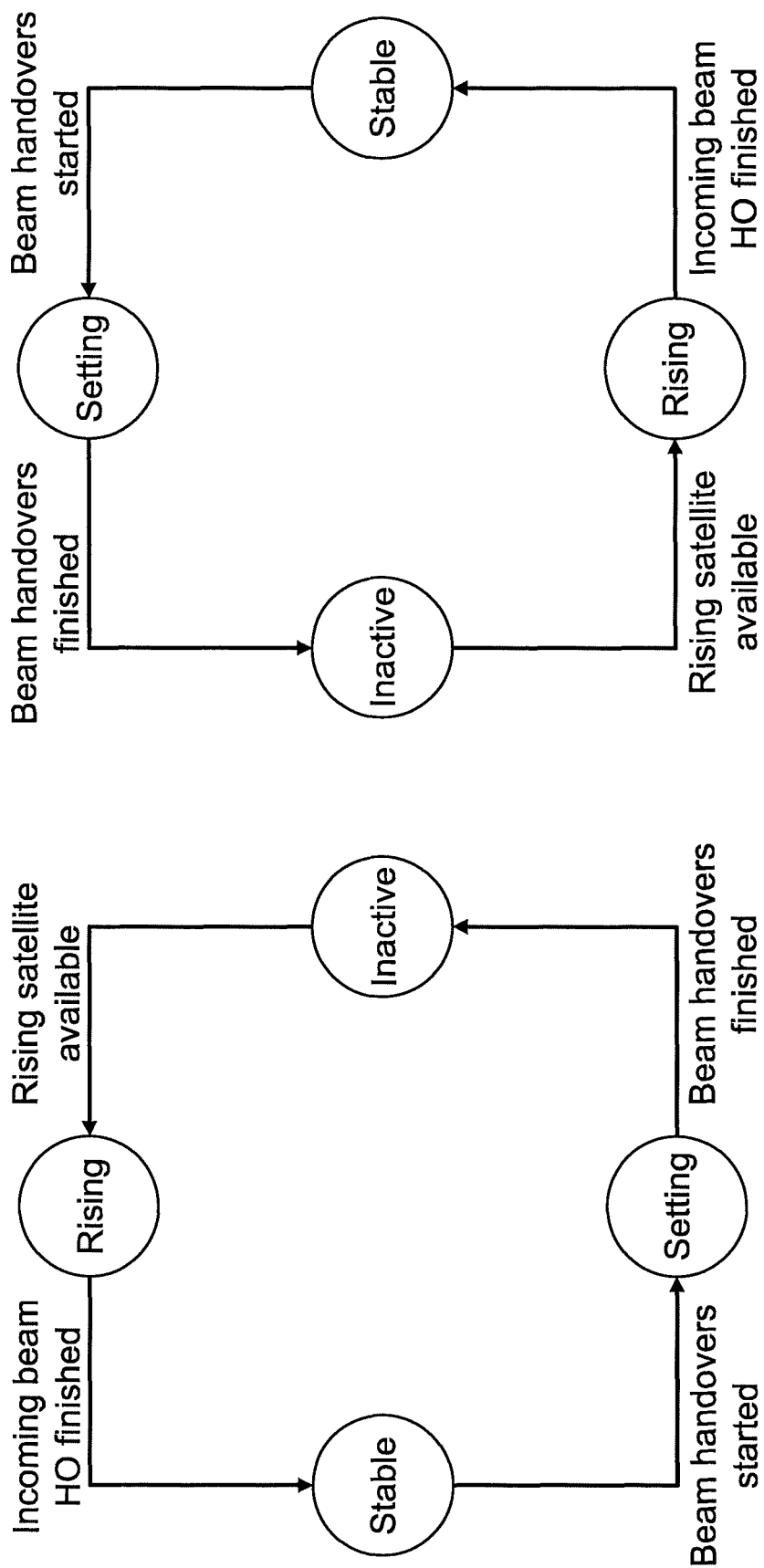
FIG. 5 shows a schematic diagram of state transitions of involved cells according to example embodiments.

FIG. 5 shows a schematic diagram of state transitions of involved cells according to example embodiments.

As is illustrated in FIG. 5, according to example embodiments, during stable state when only one satellite is covering the geographical area, one cell is active (e.g., stable state of the cell represented by the state transitions on the left hand side of FIG. 5) and the partner cell is inactive (no RF) (e.g., inactive state of the cell represented by the state transitions on the right hand side of FIG. 5).

When the current satellite is moving away from this geographical area and another satellite is coming into coverage of this area (rising satellite is available in the state transitions on the right hand side of FIG. 5), the inactive cell gets connected to this new satellite (e.g., rising state of the cell represented by the state transitions on the right hand side of FIG. 5). Thus, the two partner cells are connected to two separate satellites.

All users are handed over from the setting cell (previously active cell) to the rising cell (previously inactive cell) (beam handovers (HO) started in the state transitions on the left hand side of Figure setting state of the cell represented by the state transitions on the left hand side of FIG. 5).

Once the handovers are complete and/or the setting satellite is no longer covering the geographical area (beam handovers finished in the state transitions on the left hand side of Figure incoming beam handovers finished in the state transitions on the right hand side of FIG. 5), the setting cell becomes inactive (e.g., inactive state of the cell represented by the state transitions on the left hand side of FIG. 5). Consequently, the rising cell becomes stable (e.g., stable state of the cell represented by the state transitions on the right hand side of FIG. 5).

This state corresponds to the stable state mentioned above, with the roles of the two cells being swapped.

According to example embodiments, the beam handovers can (be triggered to) start by any of the following triggers (or a combination of these):
1) External signal from a satellite controller that a rising satellite is available,
2) Measurement report from the subscriber unit/mobile device (indicating the presence of the rising cell), and
3) Detection of an active RF link on the inactive partner cell.

Once a cell is in the setting state, according to example embodiments, the cell can trigger handover to the partner (rising cell) for a UE (mobile device) by the following methods:
1) Blind handover (HO): If the coverage of the rising and setting satellites are the same, and
2) UE/mobile device measurement based: UE (mobile device) reports the partner cell (rising cell) as a handover candidate. A dedicated measurement report can be configured at the UE for these beam handovers. This measurement would trigger only when the partner cell is visible irrespective of the serving cell measurement.

According to example embodiments, the setting cell broadcasts cell barring to meet the following goals:
1) Prevent any new UEs/mobile devices to connect to it. In such case, the UEs/mobile devices should instead connect to the rising cell,
2) Move Idle UEs/mobile devices to the rising cell faster in order to prevent loss of pages, and
3) Prevent UEs/mobile devices from a ping-pong effect of handover from the setting cell to the rising cell and then back to the setting cell.

According to further example embodiments, the setting cell starts an "unbarring timer". On expiry of this timer, the cell barring is removed to prepare the cell for the next (rising/incoming) satellite.

According to example embodiments, the setting cell has a mechanism to throttle the handovers to meet the following goals:
1) All handovers are completed within the satellite overlap time,
2) No resource overload occurs on the baseband unit,
3) PRACH congestion is minimized, and
4) Only contention free preambles are used.

According to example embodiments, preferably, the network plan shall ensure that there are no physical cell identity (PCI) conflicts between the rising and setting satellite cells. Handovers due to mobility will not be allowed from rising satellite cells to setting satellite cells. However, handovers due to mobility will be allowed from rising or setting cells to their neighbors that are not in setting state.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 6:
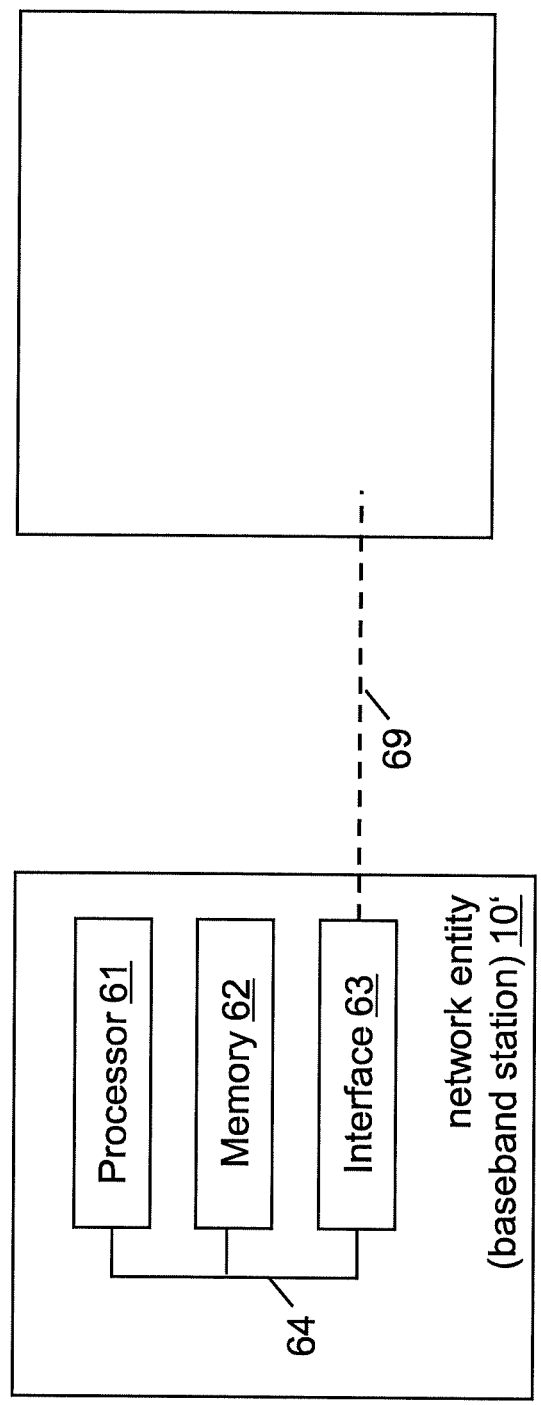
FIG. 6 is a block diagram alternatively illustrating apparatuses according to example embodiments.

In FIG. 6, an alternative illustration of apparatuses according to example embodiments is depicted. As indicated in FIG. 6, according to example embodiments, the apparatus (network entity) 10' (corresponding to the network entity 10) comprises a processor 61, a memory 62 and an interface 63, which are connected by a bus 64 or the like, and the apparatus 10' may be connected via link 69 with another apparatus (e.g. an interface of the another apparatus).

The processor 61 and/or the interface 63 may also include a modem or the like to facilitate communication over a (hardwire or wireless) link, respectively. The interface 63 may include a suitable transceiver coupled to one or more antennas or communication means for (hardwire or wireless) communications with the linked or connected device(s), respectively. The interface 63 is generally configured to communicate with at least one other apparatus, i.e. the interface thereof.

The memory 62 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network entity 10 (managing a first cell of a mobile network and a second cell of said mobile network, the first cell covering a geographical area, and the second cell covering said geographical area) comprises at least one processor 61, at least one memory 62 including computer program code, and at least one interface 63 configured for communication with at least another apparatus. The processor (i.e. the at least one processor 61, with the at least one memory 62 and the computer program code) is configured to perform maintaining assignment of a first satellite beam corresponding to a first passing satellite to said first cell, a first satellite beam coverage of said first satellite beam overlapping with said geographical area (thus the apparatus comprising corresponding means for maintaining), to perform determining entrance of a second satellite beam coverage of a second satellite beam corresponding to a second passing satellite into said geographical area (thus the apparatus comprising corresponding means for determining), to perform assigning said second satellite beam to said second cell (thus the apparatus comprising corresponding means for assigning), and to perform deciding to trigger handover of a terminal located within said second satellite beam coverage within said geographical area and served by said first cell to said second cell (thus the apparatus comprising corresponding means for deciding).

For further details regarding the operability/functionality of the individual apparatuses, reference is made to the above description in connection with any one of FIGS. 1 to 5, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for satellite coverage change handling. Such measures exemplarily comprise, at a network entity managing a first cell of a mobile network and a second cell of said mobile network, the first cell covering a geographical area, and the second cell covering said geographical area, maintaining assignment of a first satellite beam corresponding to a first passing satellite to said first cell, a first satellite beam coverage of said first satellite beam overlapping with said geographical area, determining entrance of a second satellite beam coverage of a second satellite beam corresponding to a second passing satellite into said geographical area, assigning said second satellite beam to said second cell, and deciding to trigger handover of a terminal located within said second satellite beam coverage within said geographical area and served by said first cell to said second cell.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

Among others, following example Items are covered by the above-disclosed details.

Item 1. A method of a network entity managing a first cell of a mobile network and a second cell of said mobile network, the first cell covering a geographical area, and the second cell covering said geographical area, the method comprising maintaining assignment of a first satellite beam corresponding to a first passing satellite to said first cell, a first satellite beam coverage of said first satellite beam overlapping with said geographical area, determining entrance of a second satellite beam coverage of a second satellite beam corresponding to a second passing satellite into said geographical area, assigning said second satellite beam to said second cell, and deciding to trigger handover of a terminal located within said second satellite beam coverage within said geographical area and served by said first cell to said second cell.

Item 2. The method according to Item 1, further comprising triggering said handover of said terminal to said second cell.

Item 3. The method according to Item 1 or 2, wherein in relation to said deciding to trigger handover of said terminal, the method further comprises at least one of receiving signaling indicative of that said second satellite beam is available in said second cell, receiving, from said terminal, a measurement report indicative of that said second cell is available for said terminal, receiving, from said terminal, an indication of said second cell as being a handover candidate, and detecting an active radio frequency link on said second cell.

Item 4. The method according to any of Items 1 to 3, further comprising controlling said first cell to broadcast cell barring.

Item 5. The method according to Item 4, further comprising controlling said first cell
to start a cell barring timer, and
to stop broadcasting said cell barring upon expiration of said cell barring timer.

Item 6. The method according to any of Items 1 to 5, further comprising determining to release said assignment of said first satellite beam to said first cell.

Item 7. The method according to Item 6, further comprising releasing said assignment of said first satellite beam to said first cell.

Item 8. The method according to Item 7, further comprising determining entrance of a third satellite beam coverage of a third satellite beam corresponding to a third passing satellite into said geographical area, assigning said third satellite beam to said first cell, and deciding to trigger handover of a terminal located within said third satellite beam coverage within said geographical area and served by said second cell to said first cell.

Item 9. The method according to any of Items 6 to 8, wherein in relation to said determining to release said assignment, the method further comprises at least one of detecting completed handover of all terminals served by said first cell to said second cell, and detecting that said first satellite beam coverage of said first satellite beam does not overlap with said geographical area.

Item 10. An apparatus of a network entity managing a first cell of a mobile network and a second cell of said mobile network, the first cell covering a geographical area, and the second cell covering said geographical area, the apparatus comprising maintaining circuitry configured to maintain assignment of a first satellite beam corresponding to a first passing satellite to said first cell, a first satellite beam coverage of said first satellite beam overlapping with said geographical area, entrance determining circuitry configured to determine entrance of a second satellite beam coverage of a second satellite beam corresponding to a second passing satellite into said geographical area, assigning circuitry configured to assign said second satellite beam to said second cell, and deciding circuitry configured to decide to trigger handover of a terminal located within said second satellite beam coverage within said geographical area and served by said first cell to said second cell.

Item 11. The apparatus according to Item 10, further comprising triggering circuitry configured to trigger said handover of said terminal to said second cell.

Item 12. The apparatus according to Item 10 or 11, wherein said deciding circuitry is configured to at least one of
receiving signaling indicative of that said second satellite beam is available in said second cell, receiving, from said terminal, a measurement report indicative of that said second cell is available for said terminal, receiving, from said terminal, an indication of said second cell as being a handover candidate, and detecting an active radio frequency link on said second cell.

Item 13. The apparatus according to any of Items 10 to 12, further comprising controlling circuitry configured to control said first cell to broadcast cell barring.

Item 14. The apparatus according to Item 13, further comprising controlling circuitry configured to control said first cell
to start a cell barring timer, and
to stop broadcasting said cell barring upon expiration of said cell barring timer.

Item 15. The apparatus according to any of Items 10 to 14, further comprising release determining circuitry configured to determine to release said assignment of said first satellite beam to said first cell.

Item 16. The apparatus according to Item 15, further comprising releasing circuitry configured to release said assignment of said first satellite beam to said first cell.

Item 17. The apparatus according to Item 16, wherein said entrance determining circuitry is configured to determine entrance of a third satellite beam coverage of a third satellite beam corresponding to a third passing satellite into said geographical area, said assigning circuitry is configured to assign said third satellite beam to said first cell, and said deciding circuitry is configured to decide to trigger handover of a terminal located within said third satellite beam coverage within said geographical area and served by said second cell to said first cell.

Item 18. The apparatus according to any of Items 15 to 17, wherein said release determining circuitry is configured to at least one of detecting completed handover of all terminals served by said first cell to said second cell, and detecting that said first satellite beam coverage of said first satellite beam does not overlap with said geographical area.

Item 19. An apparatus of a network entity managing a first cell of a mobile network and a second cell of said mobile network, the first cell covering a geographical area, and the second cell covering said geographical area, the apparatus comprising
at least one processor,
at least one memory including computer program code, and
at least one interface configured for communication with at least another apparatus,
the at least one processor, with the at least one memory and the computer program code, being configured to cause the apparatus to perform:
maintaining assignment of a first satellite beam corresponding to a first passing satellite to said first cell, a first satellite beam coverage of said first satellite beam overlapping with said geographical area,
determining entrance of a second satellite beam coverage of a second satellite beam corresponding to a second passing satellite into said geographical area,
assigning said second satellite beam to said second cell, and
deciding to trigger handover of a terminal located within said second satellite beam coverage within said geographical area and served by said first cell to said second cell.

Item 20. The apparatus according to Item 19, wherein
the at least one processor, with the at least one memory and the computer program code, being configured to cause the apparatus to perform:
triggering said handover of said terminal to said second cell.

Item 21. The apparatus according to Item 19 or 20, wherein
in relation to said deciding to trigger handover of said terminal, the at least one processor, with the at least one memory and the computer program code, being configured to cause the apparatus to perform at least one of:
receiving signaling indicative of that said second satellite beam is available in said second cell,
receiving, from said terminal, a measurement report indicative of that said second cell is available for said terminal,
receiving, from said terminal, an indication of said second cell as being a handover candidate, and
detecting an active radio frequency link on said second cell.

Item 22. The apparatus according to any of Items 19 to 21, wherein
the at least one processor, with the at least one memory and the computer program code, being configured to cause the apparatus to perform:
controlling said first cell to broadcast cell barring.

Item 23. The apparatus according to Item 22, wherein
the at least one processor, with the at least one memory and the computer program code, being configured to cause the apparatus to perform:
controlling said first cell
to start a cell barring timer, and
to stop broadcasting said cell barring upon expiration of said cell barring timer.

Item 24. The apparatus according to any of Items 19 to 23, wherein
the at least one processor, with the at least one memory and the computer program code, being configured to cause the apparatus to perform:
determining to release said assignment of said first satellite beam to said first cell.

Item 25. The apparatus according to Item 24, wherein
the at least one processor, with the at least one memory and the computer program code, being configured to cause the apparatus to perform:
releasing said assignment of said first satellite beam to said first cell.

Item 26. The apparatus according to Item 25, wherein
the at least one processor, with the at least one memory and the computer program code, being configured to cause the apparatus to perform:
determining entrance of a third satellite beam coverage of a third satellite beam corresponding to a third passing satellite into said geographical area,
assigning said third satellite beam to said first cell, and
deciding to trigger handover of a terminal located within said third satellite beam coverage within said geographical area and served by said second cell to said first cell.

Item 27. The apparatus according to any of Items 24 to 26, wherein
in relation to said determining to release said assignment, the at least one processor, with the at least one memory and the computer program code, being configured to cause the apparatus to perform at least one of:
detecting completed handover of all terminals served by said first cell to said second cell, and
detecting that said first satellite beam coverage of said first satellite beam does not overlap with said geographical area.

Item 28. A computer program product comprising computer-executable computer program code which, when the program is run on a computer, is configured to cause the computer to carry out the method according to any one of Items 1 to 9.

Item 29. The computer program product according to Item 28, wherein the computer program product comprises a computer-readable medium on which the computer-executable computer program code is stored, and/or wherein the program is directly loadable into an internal memory of the computer or a processor thereof.

LIST OF ACRONYMS AND ABBREVIATIONS

3GPP 3rd Generation Partnership Project
5G 5th Generation
BB baseband
HO handover
LTE Long Term Evolution
NR New Radio
PCI physical cell identity
PRACH physical random access channel
RACH random access channel
RF radio frequency
SV satellite
UE user equipment

The invention claimed is:
1. A method comprising:
performing by a network entity managing a first cell of a mobile network and a second cell of said mobile network, the first cell covering a geographical area, and the second cell covering said geographical area:
  maintaining assignment of a first satellite beam corresponding to a first passing satellite to said first cell, a first satellite beam coverage of said first satellite beam overlapping with said geographical area,
  determining entrance of a second satellite beam coverage of a second satellite beam corresponding to a second passing satellite into said geographical area, at least one of,
    receiving signaling indicative of that said second satellite beam is available in said second cell,
    receiving, from a terminal, a measurement report indicative of that said second cell is available for said terminal, or
    receiving, from said terminal, an indication of said second cell as being a handover candidate and
  assigning said second satellite beam to said second cell,
  deciding to trigger handover of said terminal located within said second satellite beam coverage within said geographical area and served with said first cell to said second cell,
  determining to release said assignment of said first satellite beam to said first cell,
  releasing said assignment of said first satellite beam to said first cell, wherein the releasing comprises controlling said first cell to perform broadcast cell barring;
  starting a cell barring timer; and
  stopping broadcasting said broadcast cell barring and removing the cell barring upon expiration of said cell barring timer;
  determining entrance of a third satellite beam coverage of a third satellite beam corresponding to a third passing satellite into said geographical area,
  assigning said third satellite beam to said first cell, deciding to trigger handover of said terminal located within said third satellite beam coverage within said geographical area and served with said second cell to said first cell,
  wherein all handovers of all terminals served by said first cell to said second cell are completed within a satellite overlap time, no resource overload occurs on a baseband unit, physical random access channel congestion is minimized, and only contention free preambles are used.

2. The method according to claim 1, further comprising triggering said handover of said terminal to said second cell.

3. The method according to claim 1, wherein
in relation to said deciding to trigger handover of said terminal, the method further comprises detecting an active radio frequency link on said second cell.

4. The method according to claim 1, comprising:
based on the releasing, setting cell broadcasts cell barring to meet preventing user equipment from connecting and causing the user equipment to connect to a partner cell preventing loss of pages, and a ping-pong effect of handover.

5. The method according to claim 1, wherein in relation to said determining to release said assignment, the method further comprises at least one of,
  detecting completed handover of the terminals served with said first cell to said second cell, or
  detecting that said first satellite beam coverage of said first satellite beam does not overlap with said geographical area.

6. An apparatus comprising:
at least one processor; and
at least one memory storing instructions that when executed by the at least one processor causes the apparatus perform with a network entity managing a first cell of a mobile network and a second cell of said mobile network, the first cell covering a geographical area, and the second cell covering said geographical area;
maintaining circuitry configured to maintain assignment of a first satellite beam corresponding to a first passing satellite to said first cell, a first satellite beam coverage of said first satellite beam overlapping with said geographical area,
entrance determining circuitry configured to determine entrance of a second satellite beam coverage of a second satellite beam corresponding to a second passing satellite into said geographical area,
receiving circuitry configured to receive signaling indicative of that said second satellite beam is available in said second cell,
receiving circuitry configured to receive, from a terminal, a measurement report indicative of that said second cell is available for said terminal, or
receiving circuitry configured to receive, from said terminal, an indication of said second cell as being a handover candidate,
assigning circuitry configured to assign said second satellite beam to said second cell,
deciding circuitry configured to decide to trigger handover of said terminal located within said second satellite beam coverage within said geographical area and served with said first cell to said second cell,
release determining circuitry configured to determine to release said assignment of said first satellite beam to said first cell, and
releasing circuitry configured to release said assignment of said first satellite beam to said first cell, wherein the releasing comprises controlling said first cell to perform broadcast cell barring, starting a cell barring timer, stopping broadcasting said broadcast cell barring and removing the cell barring upon expiration of said cell barring timer; and
wherein said entrance determining circuitry is configured to determine entrance of a third satellite beam coverage of a third satellite beam corresponding to a third passing satellite into said geographical area,
said assigning circuitry is configured to assign said third satellite beam to said first cell, and said deciding circuitry is configured to decide to trigger handover of said terminal located within said third satellite beam coverage within said geographical area and served with said second cell to said first cell, wherein all handovers of all terminals served by said first cell to said second cell are completed within a satellite overlap time, no resource overload occurs on a baseband unit, physical random access channel congestion is minimized, and only contention free preambles are used.

7. An apparatus comprising:
at least one processor, at least one memory storing instructions that, when executed with the at least one processor, cause the apparatus to perform:
  with a network entity managing a first cell of a mobile network and a second cell of said mobile network, the first cell covering a geographical area, and the second cell covering said geographical area:
maintaining assignment of a first satellite beam corresponding to a first passing satellite to said first cell, a first satellite beam coverage of said first satellite beam overlapping with said geographical area,
determining entrance of a second satellite beam coverage of a second satellite beam corresponding to a second passing satellite into said geographical area,
at least one of,
receiving signaling indicative of that said second satellite beam is available in said second cell,
receiving, from a terminal, a measurement report indicative of that said second cell is available for said terminal, or
receiving, from said terminal, an indication of said second cell as being a handover candidate and
assigning said second satellite beam to said second cell,
deciding to trigger handover of said terminal located within said second satellite beam coverage within said geographical area and served with said first cell to said second cell,
determining to release said assignment of said first satellite beam to said first cell,
releasing said assignment of said first satellite beam to said first cell, wherein the releasing comprises controlling said first cell to perform broadcast cell barring;
starting a cell barring timer; and
stopping broadcasting said broadcast cell barring and removing the cell barring upon expiration of said cell barring timer;
determining entrance of a third satellite beam coverage of a third satellite beam corresponding to a third passing satellite into said geographical area, assigning said third satellite beam to said first cell, and deciding to trigger handover of said terminal located within said third satellite beam coverage within said geographical area and served with said second cell to said first cell,
wherein all handovers of all terminals served by said first cell to said second cell are completed within a satellite overlap time, no resource overload occurs on a baseband unit, physical random access channel congestion is minimized, and only contention free preambles are used.

8. The apparatus according to claim 7, wherein the instructions, when executed with the at least one processor, cause the apparatus to perform:
triggering said handover of said terminal to said second cell.

9. The apparatus according to claim 7, wherein in relation to said deciding to trigger handover of said terminal, the instructions, when executed with the at least one processor, cause the apparatus to perform detecting an active radio frequency link on said second cell.

10. The apparatus according to claim 7, comprising:
based on the releasing, setting cell broadcasts cell barring to meet preventing user equipment from connecting and causing the user equipment to connect to a partner cell preventing loss of pages, and a ping-pong effect of handover.

11. The apparatus according to claim 7, wherein
in relation to said determining to release said assignment, the instructions, when executed with the at least one processor, cause the apparatus to perform at least one of:
detecting completed handover of the terminals served with said first cell to said second cell, or
detecting that said first satellite beam coverage of said first satellite beam does not overlap with said geographical area.

\* \* \* \* \*